United States Patent [19]

Roche et al.

[11] Patent Number: 4,496,173

[45] Date of Patent: Jan. 29, 1985

[54] THREADED COUPLING

[75] Inventors: Joseph R. Roche; Charles D. Morrill; Joseph H. Hynes, all of Houston, Tex.

[73] Assignee: Hydril Company, Los Angeles, Calif.

[21] Appl. No.: 493,422

[22] Filed: May 10, 1983

Related U.S. Application Data

[63] Continuation of Ser. No. 182,120, Aug. 28, 1980, abandoned.

[51] Int. Cl.³ .............................................. F16L 35/00
[52] U.S. Cl. ......................................... 285/24; 285/39; 285/91; 285/137 A; 285/317; 285/353
[58] Field of Search ...................... 285/18, 24, 27, 39, 285/353, 92, 84, 91, 384, 137 A, 317

[56] References Cited

U.S. PATENT DOCUMENTS

| | | | |
|---|---|---|---|
| 986,818 | 3/1911 | Graham | 285/84 |
| 2,562,294 | 7/1951 | Cahenzli | 285/353 X |
| 2,645,506 | 7/1953 | Stugis | 285/27 X |
| 3,353,847 | 11/1967 | Brown | 285/18 |
| 3,948,545 | 4/1976 | Bonds | 285/39 X |
| 4,165,891 | 8/1979 | Sulloway et al. | 285/18 |
| 4,185,856 | 1/1980 | McCaskill | 285/18 |
| 4,280,719 | 7/1981 | Daniel et al. | 285/137 A |

Primary Examiner—Dave W. Arola
Attorney, Agent, or Firm—Dodge & Bush

[57] ABSTRACT

A coupling for first and second pipe sections where end portions on the first and second pipe sections are shaped and dimensioned so that the end portion of the first pipe section can be inserted in the end portion of the second pipe section. Penetration of the first section is limited relative to the second section. The outer surface of the end of the second pipe section adjacent to the other section includes at least a first set of continuous helical spin-up threads. A female union box is connected to the first section, the inner surface of the box including at least a first set of continuous helical spin-up threads interengaged with the set of threads on the second pipe section, the union box further including an additional set of helical power threads. A power ring is located around the first section and includes a set of helical power threads interengaged with the helical power threads on the union box. The power ring operably engages the first section for applying a preload force to the coupling connection when the power threads are interengaged and prevents the pipe sections from moving axially relative to each other. A fluid tight seal is provided between the pipe sections.

34 Claims, 8 Drawing Figures

THREADED COUPLING

This application is a continuation of application Ser. No. 182,120 filed Aug. 28, 1980, now abandoned.

TECHNICAL FIELD

This invention relates to threaded pipe couplings and, more particularly, to a coupling which can be used to form a strong mechanical connection between relatively large diameter pipe sections which has short make-up time, relatively small mass and the ability to uniformly pre-load the connection.

This invention is related to the ones shown and described in the following U.S. patent applications, Ser. No. 105,135, now abandoned, entitled "Improved Union-Type Coupling For Marine Drilling Riser Pipe" and Ser. No. 105,136, now abandoned, entitled "Union-Type Coupling For Marine Drilling Riser Pipe", both of which were filed on Dec. 19, 1979, the inventions in which are owned by the same entity which owns the subject invention. The subject matter of both of these applications is incorporated by reference herein as though fully set forth.

The subject coupling is useful for connecting pipe sections which have relatively large diameters and is an improvement over couplings which have been used in the past such as, for example, where mating flanges are formed on the ends of adjacent pipe sections which are connected through a plurality of bolts spaced around the flanges. Riser pipes which are used to connect surface drilling vessels with undersea wellheads are one example of the types of pipe to which the subject coupling can be applied.

The subject coupling is suited for marine risers because they are vertically deployed from floating vessels and there are other factors which cause special problems when sections of pipe which make up these risers are joined together. Non-uniform forces caused by waves, currents and vessel displacement require the undersea couplings to withstand relatively high bending and tensile loads. Because the ratio of a marine riser's length to its diameter is very high, the riser assembly would fail in buckling if it should ever be subjected to compressive loading, therefore, the riser must continuously be maintained in tension over its entire length. External buoyancy devices attached to individual riser pipe joints and vessel mounted tensioning apparatus have been used in the past to provide this loading on the riser pipe, but have proven to be less than satisfactory.

The presence of heavy drilling fluid inside the riser pipe is yet another source of load application to the riser assembly. As a result of this complex and sizeable load application, these couplings must be significantly stronger and tougher (consequently more massive) than those of, for example, above-water applications. At the same time, there are underlying reasons for minimizing the mass of the riser couplings. Some of these considerations are: reduced buoyancy material costs, reduced vessel supported tensioner requirements, less hydrodynamic drag and reduced deck loading during storage. Further, assembly of these risers is an enormously expensive operation so even a seemingly minor savings in the time required for coupling or "making-up" adjacent sections of pipe will translate directly into significantly lower operating costs.

A typical marine riser coupling normally employs a plurality of bolts spaced at intervals around its circumference. By tightening these bolts the junction between two pipe sections is produced typically by engaging dogs in grooves or compressing mating flange faces. In practice it is virtually impossible to apply exactly the same torque to each and every bolt. Consequently, the preload distribution around the circumference of the coupling is uneven, not axisymmetrical. The inability to control the circumferential uniformity of the preload negates the accuracy of analytical methods of predicting the local stresses in the coupling. The local stress concentration factors and fatigue life of a coupling that is not correctly made up (i.e., each dog or bolt equally and exactly preloaded) will vary from values predicted analytically.

In addition to the circumferential inconsistency of multiple bolt preload application, the tightening of a plurality of bolts requires numerous separate operations and consumes valuable rig operating time. It is possible for one or more bolts to be inadvertently overlooked, that is, not tightened fully. This could cause the other bolts to fail from carrying much more than their rated design load. Thus, a means of applying a circumferentially uniform preload in one simple operation would constitute a substantial improvement over couplings used in the past. Further, some of the riser coupling models shown in prior art can only be disconnected by reversing the mechanical operations by which connection was made. Should the joining connection mechanism become jammed or blocked by debris or if a bolt should become galled, no alternate means is available by which disconnection can be made so that a secondary release means is desirable.

BACKGROUND ART

U.S. Pat. No. 4,161,332, owned by the same company which owns the subject invention, is directed to a cylindrical stepped-thread configuration for pin and box joints for oil well tubing, a configuration which virtually eliminates the possibility of cross threading during make-up of pipe sections and results in shorter assembly time. This thread arrangement includes first and second pairs of interengaged sets of spin-up threads, one pair of threads being axially and radially spaced from the second pair.

U.S. Pat. Nos. 4,043,575 and 4,097,069 are directed to union-type couplings for riser pipes that both utilize interrupted load carrying surfaces which cause an uneven load distribution around the circumference of the coupling, requiring a more massive coupling structure. Further, interrupted threads such as the ones in U.S. Pat. No. 4,097,069 are generally more expensive to manufacture than continuous threads because of the greater number of machining operations involved.

U.S. Pat. Nos. 3,827,728 and 4,068,865 are related to dog-type riser couplings which utilize multibolt make-up means which require identical torque application and strain of each bolt to insure loading within design parameters.

U.S. Pat. Nos. 4,093,281 and 4,124,230 utilize hydraulic cylinders to create a pre-tension on the box and pin portions and result in a relatively large coupling mass and structural complexity.

DISCLOSURE OF THE INVENTION

In accordance with the present invention, a coupling is provided for adjacent pipe sections which has special applicability to marine riser pipes, but which can be used in other applications although the following description is directed specifically to riser pipes. A pair of riser pipe sections are penetratingly joined, the uppermost section including a portion known as a mandrel which is inserted into the upper end of the lowermost section, the sections being designed to engage each other for limiting inward movement of the inserted section relative to the other section.

A female union "box member" is carried on the uppermost section to couple the sections together. The inner surface of the box member and the portion of the lowermost pipe section adjacent to the uppermost section, or "pin member", include first and second pairs of interengaged sets of continuous spin-up threads, the first thread set being axially and radially spaced relative to the second set. The box has a separate set of power threads which remain interengaged with a mating set of power threads on a power ring so that the power ring is carried by the box. The power ring has a shoulder which serves as a stop means for engagement of the spin-up threads and also as a bearing surface for application of preload force to the connection by the power ring.

The spin-up threads are opposite hand to the power threads, that is, one is a left-handed thread and the other right-handed. After the upper pipe section which carries the box member and power ring is lowered into coupling position relative to the lower section, the box member is rotated to tighten the spin-up threads. Spring loaded detent pins operate to connect the box member and power ring for preventing relative movement between them while the box member is rotated. Cooperating pairs of openings are located in the upper sides of the box member and power ring which are designed to receive driving dowels which push the detent pins downwardly to disconnect them from the power ring and pull the openings toward each other for tightening the power threads and applying the preload to a torous located on the upper pipe section between the power ring and lower pipe section. The opposite hand threads prevent the spin-up threads from loosening when the power threads are tightened. Other spring loaded detent pins in the box member engage the power ring and act as an indexing means for indicating when the power ring is properly tightened and for preventing the power threads from backing off.

In order to prevent the box member from loosening and provide an indexing means for the spin-up threads, a locking mechanism can be provided which includes a locking member or key formed of a rigid material which is adapted to slide up and down in a guide formed on the outer surface of the box member. The key and guide are cooperatively shaped and dimensioned so that the element is restrained by the guide from moving laterally while being permitted limited up and down movement.

A notch is formed on a shoulder of the pipe section located directly below the groove on the box member when the coupling is made up. While the box member is being rotated into place, a support block on a spider assembly which is used to hold the riser pipe sections already in place operates to block the notch and prevent the key from falling by gravity into the notch. After the box member is rotated into place, the support block is removed, allowing the key to fall by gravity into the notch which is cooperatively shaped and dimensioned with the lower portion of the key for restraining the key from lateral movement. As long as the key remains in this position, the box member is prevented from rotating so that the coupling remains tight. A lower surface of the key which engages the notch is tapered and cooperates with a similarly tapered surface of the notch for providing a radial tolerance which allows the key to slide into the notch and lock the box and pin together through a limited range.

The subject coupling has specific advantages of the two distinct thread types. Box-to-pin engagement and spin-up-to-the-snug position are accomplished using spin-up threads that readily begin engagement without cross threading. A generous pitch of such threads along with a large thread root enable a strong mechanical connection to be made with a relatively few interengaging turns of the box on the pin. Such a multiple stepped thread further enhances ease of make-up by according multiple thread wrap engagement for each engaging revolution.

Preload is applied to the coupling with a separate set of threads between the box and a power ring, these threads already being interengaged and needing only a small relative angular displacement to produce the relative axial displacement of the box and pin to induce elastic deformation (or compressive strain) in an integral torus on the mandrel. The direct load path between the power ring and the box provided by the pairs of openings in the power ring and box member which are pulled toward each other obviates the need for a spider or a back-up line to absorb reaction to tangential force applied to the power ring for inducing axial preload. Uniform circumferential preloading is achieved by timing and sizing the threads accurately and designing both threads so that a whole number(s) of thread pitches are engaged when the coupling is fully made up. The accurate timing and sizing also assure that the preload is accurate in magnitude, that the preload is repeatable in magnitude for numerous making and breaking of the coupling and that the preload is repeatable in magnitude for interchangeable components.

The compressive strain maintains the preload on the fully engaged threaded connection. The power threads which apply the preload to the connection are designed expressly to transmit and hold a high axial load with a make-up torque magnitude that can be applied by methods employing conventional devices. Upper and lower choke and kill line sections are also penetratingly joined and supported through connections with the riser pipe sections.

Although this coupling has a seemingly simple structure, it offers significant advantages over prior art riser section couplings. The continuous threads provide a uniform stress distribution circumferentially around the coupling which accordingly reduces the size requirements of the coupling structure. The stepped-thread configuration, with one set of spin-up threads axially and radially spaced from the other set, allows continuous threads to be used for these large riser pipe sections since stepped-threads of this type provide for deeper insertion of the pin member before the box member is rotated. This essentially eliminates the problems of misalignment. Use of these two-stepped threads is described in greater detail in U.S. Pat. No. 4,161,332, which, as mentioned above, is totally incorporated by reference herein as though it is fully set forth.

The power threads which apply the preload to the connection are likewise uniformly preloaded around the circumference of the coupling. The thread design enables close control to be maintained over the amount of elastic deformation induced on the mandrel torus. Therefore, the magnitude of the preload is more closely measurable and repeatable among successive connections of separate coupling members. The close machining tolerances and accuracy of modern manufacturing processes enable the components to be precisely manufactured for interchangeable assembly.

The box assembly is "free-floating" so that the mandrel and pin member outer end will support the weight of the upper riser during make-up instead of the threads.

BRIEF DESCRIPTION OF THE DRAWINGS

A better understanding of the details of the invention will be obtained from the detailed description of a preferred embodiment of the invention, set forth below, when considered in connection with the accompanying drawings, in which.

BEST MODE FOR CARRYING OUT THE INVENTION

Figure 1:
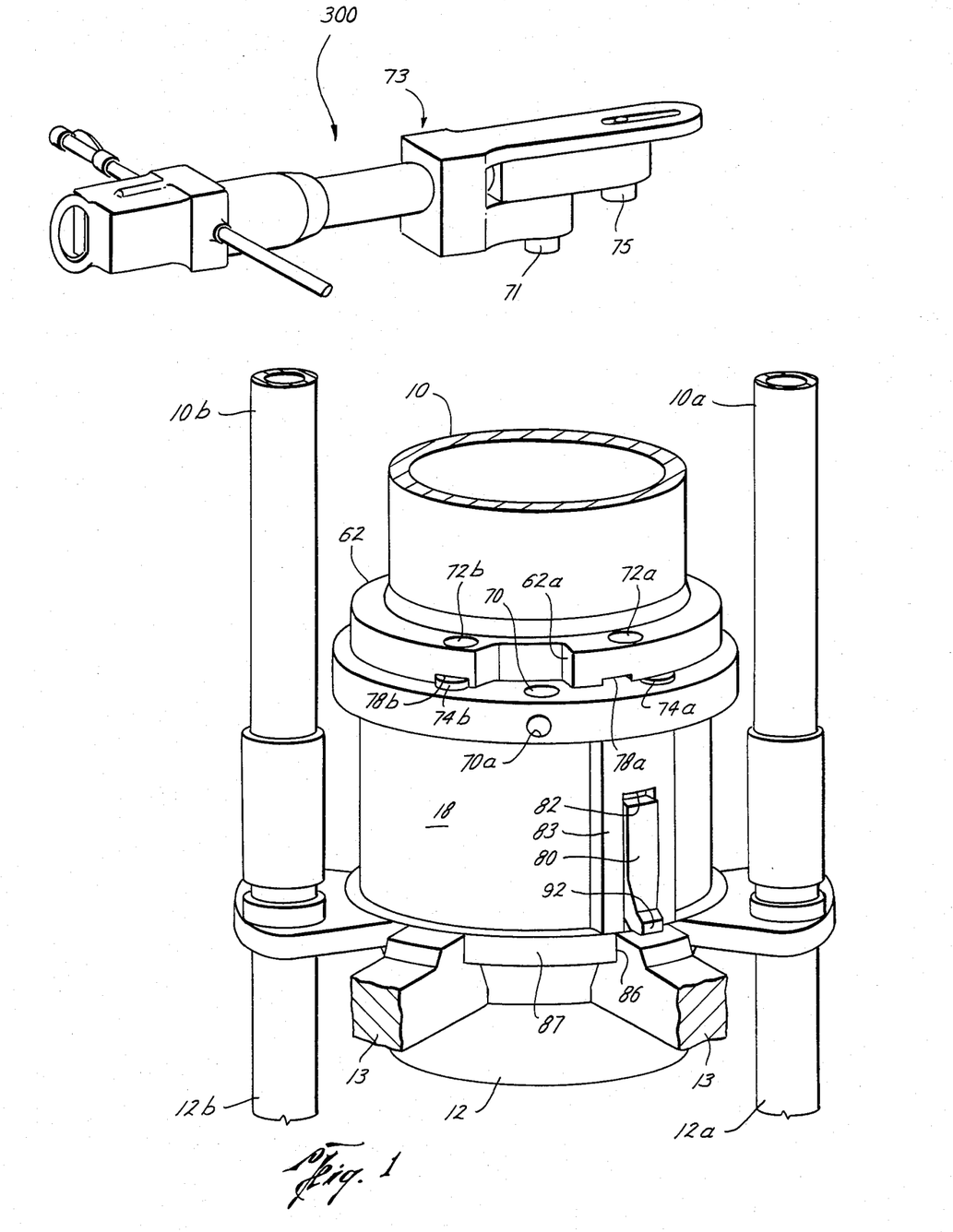
FIG. 1 is a side plan view, partially in section, of a preferred embodiment of the invention where the coupling is used in conjunction with undersea riser pipe sections and an upper riser section is inserted into a lower riser section, and further illustrating a make up tool used to tighten and loosen the coupling between lower and upper riser pipe sections.
Figure 2:
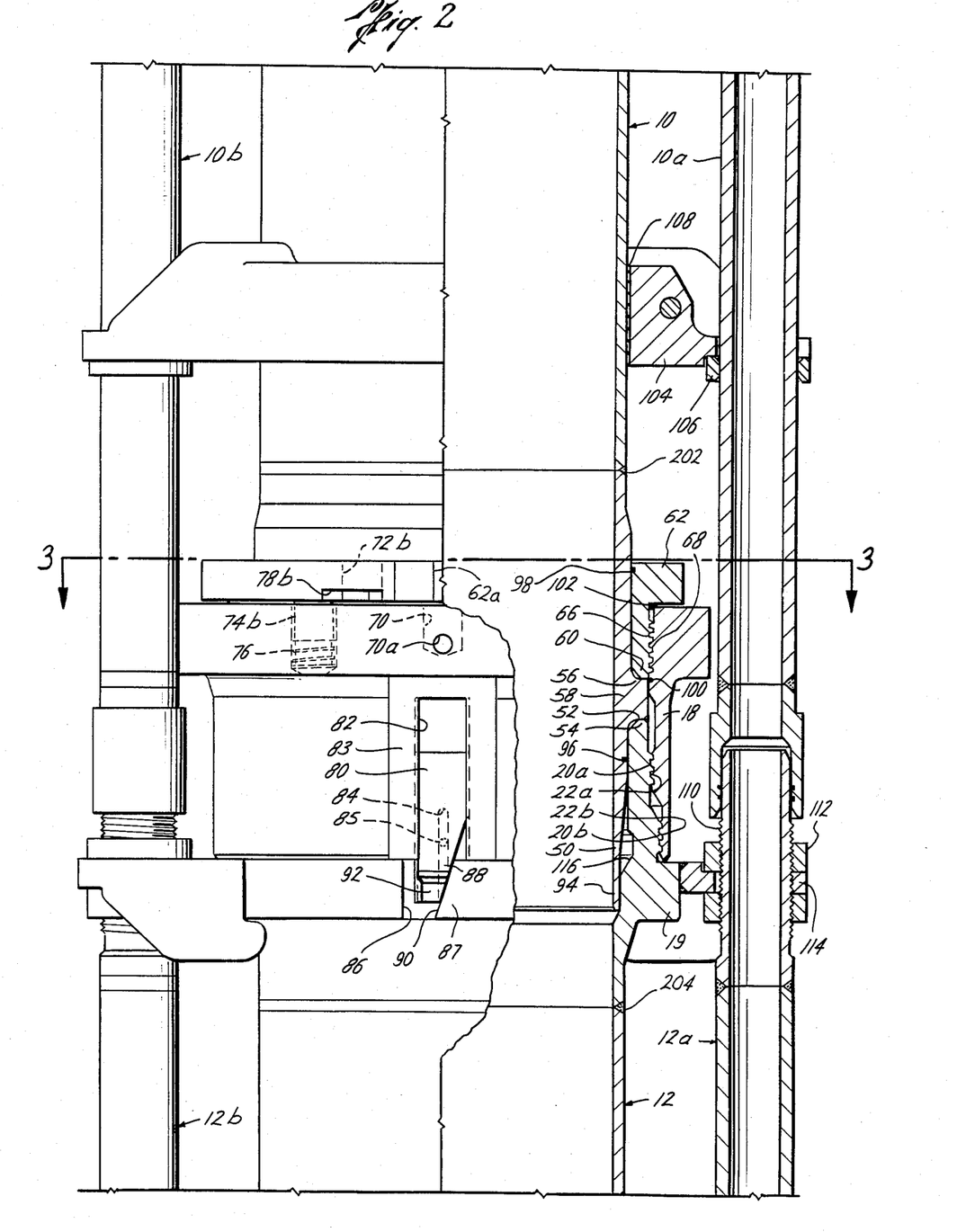
FIG. 2 illustrates in a side plan view, partially in section a coupling between upper and lower riser pipe sections including a choke or kill line coupling connected to the riser pipe sections.

Referring to FIGS. 1 and 2, a preferred embodiment of the subject invention is shown where reference numeral 10 refers to an upper riser pipe section and reference numeral 12 to a lower riser pipe section. Choke and kill line sections 10a, 12a, and 10b, 12b, are supported by the riser sections 10, 12, respectively, which together form what is known as an integral riser coupling. Although the preferred embodiment of the invention is described in conjunction with riser pipe sections, the invention is not limited to that application and can be used for coupling other types of pipe sections.

Figure 6:
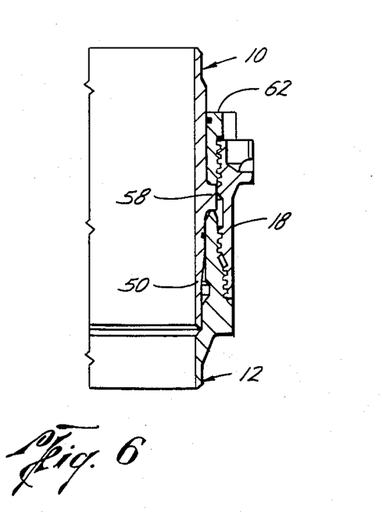
Figure 7:
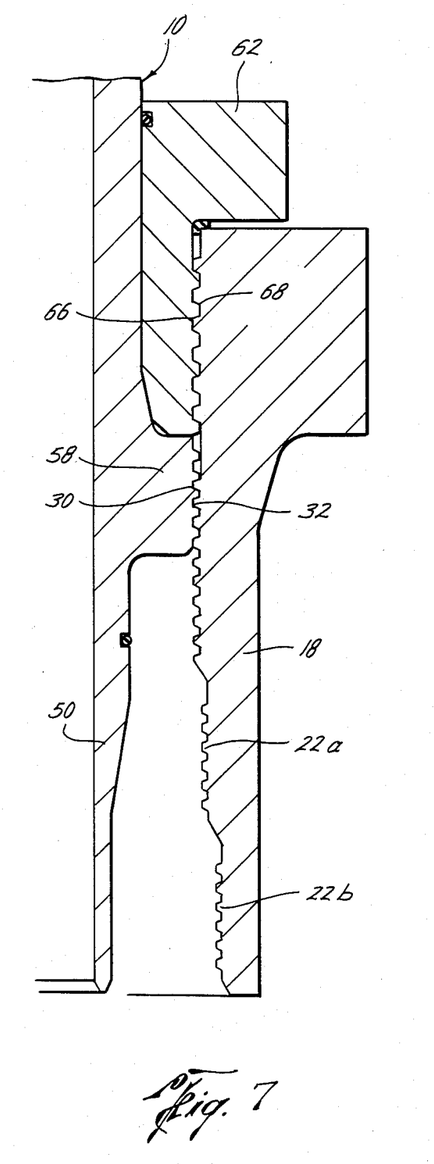
FIG. 7 is a partial side sectional view of an optional feature of the invention.
Figure 8:
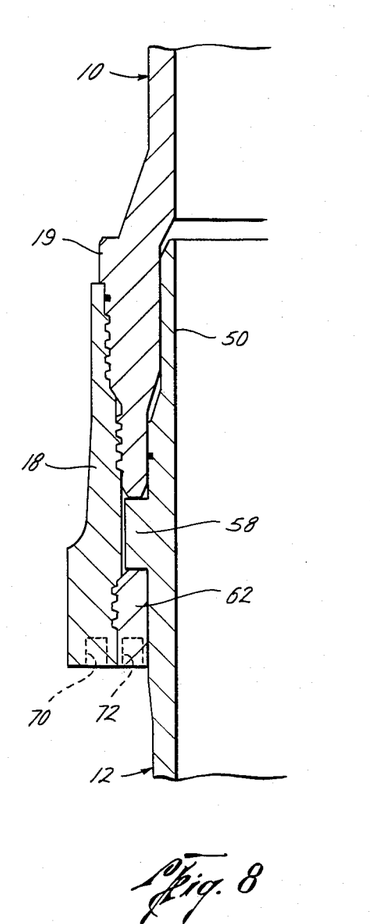
FIG. 8 is a partial side sectional view of another embodiment of the invention.

The riser pipe sections are joined through a union-type coupling by holding the lower section 12 in a spider partially illustrated in FIG. 1 by reference numeral 13 and lowering the upper section 10 until the former is "stabbed" or penetrated by the latter. The choke and kill line sections are also joined as shown in FIGS. 1 and 2. Although the description in conjunction with FIGS. 1, 2, 4–7 is directed to an embodiment where the lower end of the upper section is inserted in the upper end of the lower section similar to the coupling shown in co-pending application Ser. No. 105,136 mentioned above, the invention is also applicable to riser pipe sections where the lower section is inserted in the upper one as shown in FIG. 8 which is similar to the coupling in co-pending application Ser. No. 105,135 mentioned above.

As shown in FIG. 2, the upper riser section 10 has a mandrel portion 50 formed at its lower end. As shown in FIG. 2, the upper riser section 10 has a mandrel portion 50 formed at its lower end, preferably by welding the mandrel 50 to the upper riser 10 as illustrated by weld 202. A pin member 19 is preferably welded to the lower riser 12 by weld 204. Before mandrel 50 is welded to upper riser section 10, power ring 62 is slidingly placed about upper riser pipe section 10. After welding of section 10 to mandrel 50, the power ring 62 may be lowered until the shoulder or inner circular planar surface 60 of power ring 62 engages the upper shoulder 56 of torus 58 of the mandrel 50 enabling power ring 62 to be carried by the mandrel 50. After welding of the mandrel to upper riser 10, the union box member 18 may be interengaged with power ring 62 using threads 66 and 68. Thus, box member 18 and power ring 62 are thereafter carried or supported by the upper riser 10 by engagement of the power ring 62 with the upper shoulder 56 of the torus 58. The mandrel 50 is inserted into the riser section 12 to provide the penetrated fit between the two sections. When the upper riser section 10 is lowered in place from the position shown in FIG. 4 to the position shown in FIG. 5, a threaded female union box member 18 which is carried at the lower end of the riser section 10 is lowered and overlaps the upper threaded end or pin member 19 of the riser section 12. The box member 18 and the pin member 19 are both provided with first and second sets of continuous spin-up threads, the sets on the pin member 19 being designated by reference numerals 20a and 20b and on the box member 18 by reference numerals 22a and 22b. As shown best in FIG. 2, the first sets of spin-up threads 20a and 22a are axially and radially spaced from the second sets 20b and 22b. These threads can be similar in design to the ones described and claimed in U.S. Pat. No. 4,161,332 which, as mentioned above, is incorporated by reference herein. An improved configuration of stepped threads can also be used where small gaps are provided on the outer and lower sides of the dove-tail threads so that the pin and box members will be drawn toward each other when the riser sections are held in tension, that improvement being shown and described in a U.S. patent application Ser. No. 932,278, filed Aug. 9, 1978, now abandoned, and entitled "Threaded Connection", which is also owned by the same company which owns the subject invention and which is also totally incorporated by reference herein as though fully set forth.

Penetration of the mandrel 50 is limited by contact between a shoulder 52 of a torus 58 formed integral with the upper riser pipe section 10 and an outer end 54 of the lower riser pipe section 12. The facts that the threads are not used to induce alignment and that the threads never support the weight of the pipe sections during make-up reduce the risk of thread damage. The two-stepped thread configuration provides a deeper overlap than non-stepped threads between the box and pin member to complete the joint. This, along with the self-alignment feature of such threads, reduces make-up time and virtually eliminates cross-threading and misalignment.

Figure 4:
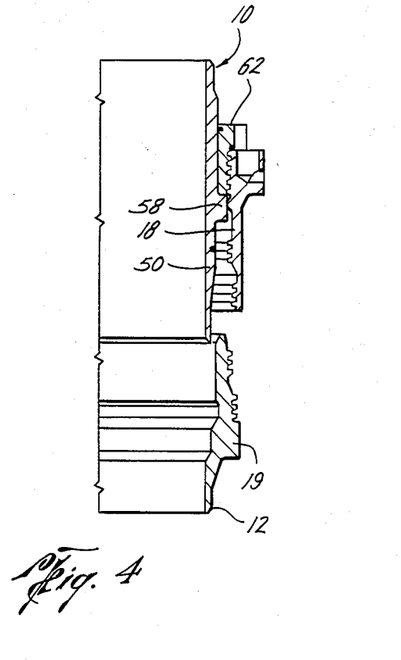
FIGS. 4–6 are partial side sectional views of the embodiment of the invention shown in FIGS. 1 and 2 showing, in particular, the sequence of steps for forming the coupling.
Figure 5:
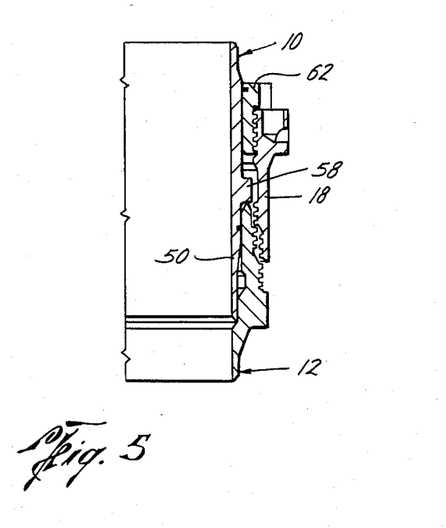

As shown in FIGS. 2 and 4 the outer end of the mandrel 50 extends beyond the lower end of the box member 18 so that the mandrel is easily visible to facilitate insertion in the pin member 19. Insertion is also made easier by a smaller outer diameter dimension of the end of the mandrel than the internal diameter opening in the pin member. As an alternative to a longer end for the mandrel, mating threads 30, 32, as shown in FIG. 7, can be formed between the outer surface of the torus 58 and the box member 18 so that the box can extend beyond the end of the mandrel and protect it during storage and transport and be conveniently lifted by rotating it to expose the end of the mandrel so it can be visually observed during insertion.

An upper shoulder 56 on the torus 58 engages an inner circular planar surface or shoulder 60 on a power ring 62. The surfaces 60 and 54 are brought into physical contact respectively with surfaces 56 and 52 by the spinning-up of the box 18 on the pin 19. When a snug engagement of the box 18 and the pin 19 has been achieved as shown in FIG. 6, preload forces are then applied, as discussed in greater detail below, by rotating the box 18 and power ring 62 relative to each other through interengagement of power threads 66 and 68 which are formed on the power ring 62 and box member 18 and operate to induce axial displacement for exerting a compressive load on the torus 58 between surfaces 60 and 54. The power ring 62 remains interengaged to the box member 18 through the power threads 66, 68 throughout storage, handling and deployment of the upper riser section 10 for minimizing wear and exposure of the threads and enabling a lubricated seal to be maintained for the threads.

Elastic deformation of the torus 58 caused by the compressive load results in an axial preload force which circumferentially uniformly loads the spin-up threads 20a, 20b, 22a and 22b and the power threads 66 and 68. This load combined with the frictional force between mating thread surfaces provide a strong mechanical connection.

The box member 18 is rotated relative to the pin member 19 for tightening the spin-up threads 20a, 20b and 22a, 22b, respectively. Recesses 62a are formed in the power ring 62 so the openings 70 are accessible. A plurality of openings 72a and 72b are provided on the power ring 62 for tightening and loosening the power threads 66 and 68 as described below. Multiple sets of openings can be provided for accommodating different types of make-up tools.

Figure 3:
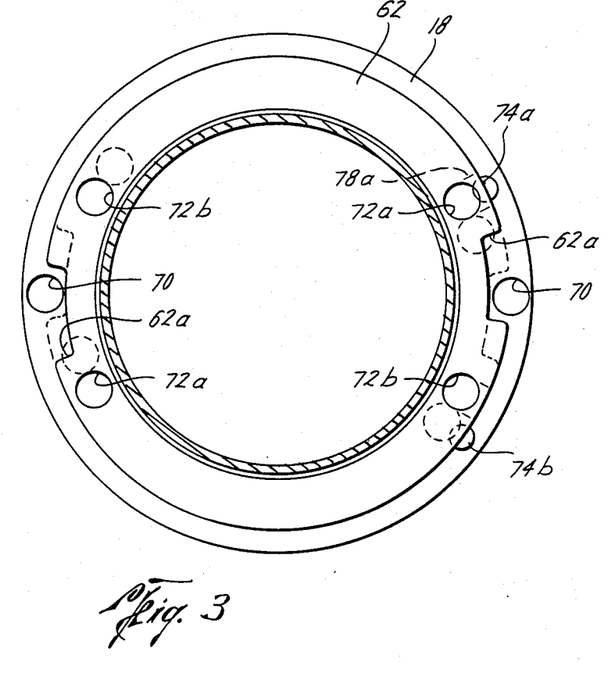
FIG. 3 is a sectional view looking along a section line in the direction of arrows 3—3 as shown in FIG. 1, but rotated 90° from FIG. 1 for illustrative purposes.

The spin-up threads 20a, 22a and 20b, 22b are the opposite hand to the power threads 66 and 68, that is the former are right-handed threads and the latter are left-handed. When the box member is rotated, a plurality of detent pins 74a located in openings formed in the box member 18 and urged upwardly by springs 76 (see FIG. 2) engage slots 78a formed in the undersurface of the power ring 62 for preventing relative movement between the power ring 62 and box member 18. When the box member 18 and pin 19 are snugly engaged as shown in FIG. 6, the power ring 62 is tightened relative to the box member 18 for applying the preload as described above by inserting driving dowels 71 and 75 on a make-up tool 300 or the like in each pair of openings 70 and 72a. The dowels operate to depress the detent pins 74a so that the power ring 62 can move relative to the box member 18 and pull the openings 70 and 72b toward each other to the positions shown by the broken lines in FIG. 3 for tightening the power threads 66, 68. By forming the spin-up and power threads with opposite hands, application of preload torque to the power threads will not loosen the spin-up threads.

When the power ring 62 is moved to the tightened position, spring-loaded detent pins 74b located in openings on the upper surface of the pin member 18 move into the slots 78b of the openings 72b for locking the power ring 62 in place and preventing the power threads from backing off. To loosen the power ring 62 and box 19, the driving dowels are inserted in the openings 70 and 72b and operate to push then apart in a similar manner. The detent pins 74a and 74b operate as indexing means, the former for assuring proper orientation between the power ring and box so that the correct preload is applied and the latter for fixing the amount of relative angular displacement between the power ring and box after breaking-out or releasing the connection. The slots 78a, 78b are sized slightly larger than the detent pins for providing a radial clearance so that indexing can effectively be achieved within design tolerances.

The make-up tool 300 illustrated in FIG. 1 employs commonly available mechanical, hydraulic, and/or pneumatic devices to power the two driving dowels 71, 75 after insertion into the openings for moving them apart or together as needed to either apply the preload torque or break loose the power ring 62 and box 18. A significant advantage of applying the preload in this manner is that the spider or a back-up line is not needed to absorb reaction to a tangential force applied to the power ring. The detent pins 74a, 74b extend beyond the outer edge of the power ring 62 as shown in FIG. 2 so that they are accessible outside the openings 72a, 72b in case they must be depressed other than by the driving dowels. Lateral openings 70a communicate the openings 70 through the sidewall of the box 18 for allowing water and debris to wash out of the openings 70 when the pipe sections are raised out of the water. The load ring 62 serves several purposes. It may be disengaged from the box so that internal parts can be inspected or the box replaced or it can be used as a secondary means of disconnecting the coupling.

In order to prevent the box member 18 from becoming loosened because of vibrations from drill pipe (not shown) and the action of sub-surface currents on the riser pipe sections, a locking element or key 80 is mounted in a groove 82, formed between a housing 83 connected to the box member and the outer surface of the box member 18. The key 80 and groove 82 are formed with complementary dovetail-shaped surfaces so that the key can slide up and down and be retained in the groove 82. The rear surface of the key 80 includes a slot 84 (illustrated in FIG. 2) which extends along a portion of the length of the key 80, the slot 84 cooperating with a pin 85 which projects outwardly from the outer surface of the box member 18 for preventing the key 80 from sliding downwardly out of the groove 82.

A notch 86 illustrated in FIGS. 1 and 2 is formed in a housing 87 connected to the outer surface of the pin member 19, which is bridged by a support block 13 located on the spider (not shown) when the spider holds the lower riser pipe section 12 so that the upper section 10 can be coupled to it. By blocking the notch 86 when the box member 19 is rotated for tightening the spin-up threads, the key 80 is prevented from falling by gravity into the notch. When the spider is removed, the key 80 falls into the notch as shown in FIG. 2 for locking the union box 18 against rotational movement relative to the pin member 19.

One of the lower surfaces of the key 80 is tapered as designated by reference numeral 88 which cooperates with a tapered surface 90 of the notch 86, the two tapered surfaces engaging each other as the locking element 80 falls into the notch. The cooperating tapered surfaces provide a radial clearance so that the key can fit into the notch within the manufacturing tolerances of the components of the coupling. The taper angle is such that torsional forces cannot overcome the frictional forces between the engaged tapered surfaces so that the spin-up threads are prevented from backing off.

The lower end of the key 80 includes a foot 92 which engages the spider (not shown) for raising the key when appropriate. Since the key 80 is gravity actuated when the coupling is being formed, it is simple to operate and does not require any manipulative steps. The axial movement of the key 80 along with the tapered surfaces allow it to work effectively within manufacturing tolerances of the components and provide an effective locking mechanism. The locking mechanism also serves as an indexing means for assuring proper make-up position of the spin-up threads and correct elastically strained orientation of the power ring, mandrel, box and pin after application of preload force.

The primary fluid seal between the pipe sections can be formed between a seal surface 94 on the outer end of the mandrel 50 and the mating inner diameter wall of the pin member 19. An O-ring 96 is provided between the mandrel 50 and the pin portion as an auxiliary fluid seal. Lubricant seal rings 98, 100 and 102 can be provided as shown in FIG. 1 for preventing lubricant between mating surfaces on both sides of the power ring 62 from leaking or washing out. Suitable lubricant fittings (not shown) can be provided for injecting lubricant into the sealed area.

An alternative embodiment of the invention is shown in FIG. 8 where the mandrel 50 is formed on the lower riser section 12 and is inserted into the upper riser section 10. The pin 19 is formed on the outer end of the upper section 10 and engages the box member 18 through spin-up threads similar to those described above. The power ring 62 engages the box member 18 through power threads and operates to form a preload on the torus 58. The power ring 62 is tightened and loosened by appropriate driving dowels which move the openings 72 toward and away from the opening 70 in a way similar to that described above in conjunction with FIGS. 1-5.

As shown in FIG. 2, an upper support for the upper choke and kill line section 10a, 10b, designated by reference numeral 104, is provided in the form of a removable split ring so that assembly and fabrication of the coupling joint is facilitated. The support ring 104 circumscribes the outer surface of the riser pipe section 10 and operates to hold the choke and kill line sections in place by engaging a shoulder 106 located on the latter. An elastomeric friction pad 108 provides secure non-slip contact between the upper support ring and the pipe surface.

The pin ends of the choke and kill lines are threaded as indicated by reference numeral 110. Threaded support rings 112 are mounted on the threads and engage support brackets 114 connected to the pin member 19, the support rings 112 being rotatably adjustable for accommodating variations in pipe length due to manufacturing tolerances.

Further, as shown in FIG. 2 an annular groove 116 is formed around the inner surface of the pin member 19 which provides a shoulder for engagement by dogs (not shown) or a ring on a handling tool for picking up and holding riser joints and attachments such as a blowout prevent stack with the traveling block of a derrick and performing other operations on the riser string. This configuration can be used to facilitate handling of the riser pipe sections during deployment or retrieval of the riser system.

Thus, a coupling is provided which uses two types of threads which provide an advantage in repeatability and accuracy of an applied preload that is essentially uniformly distributed around the circumference of the pipe sections. Conventional power supplies and mechanisms can be used to apply preload force or force to break loose the connection. Simple yet effective locking mechanisms are provided for preventing the threads from backing off or loosening during undersea operations.

Also, a coupling is provided which requires significantly less mass to resist undersea tensile and bending loading than couplings in the prior art, which offers the advantages described above. The coupling can be formed in significantly less time than those in the prior art, resulting in lower operating costs.

It should be understood that those with ordinary skill in the relevant art will be able to make improvements and modifications to the invention and that all such improvements and modifications are contemplated as falling within the scope of the appended claims.

We claim:

1. A coupling adapted for releasably securing vertically disposed first and second relatively large diameter pipe sections with a circumferentially uniform distributed preload, comprising:
   (a) end portions on the first and second pipe sections which are shaped and dimensioned so that the end portion of the first pipe section is telescopically positionable in the end portion of the second pipe section, and first and second shoulder means on the outer surface of the first pipe section, the second shoulder means for limiting telescopic positioning of the first pipe section relative to the second pipe section;
   (b) the outer surface of the end of the second pipe section disposed adjacent to the first section including at least a first set of continuous helical spin-up threads extending substantially continuously about the circumference of said outer surface;
   (c) a union box rotatably mounted to the first section, the inner surface of the union box including at least a first set of continuous helical spin-up threads interengaged with the set of threads on the second pipe section for releasably securing the union box to said second pipe section by substantially continuous spin-up thread engagement, the union box further including an additional set of helical power threads;
   (d) a power ring located around the first pipe section and including a set of helical power threads interengaged with the helical power threads formed on the union box for operably securing the power ring to the union box in a predetermined axial relationship, said interengaged helical power threads extending substantially continuously about the circumference of said power ring;
   (e) the power ring operably engaging the first shoulder means of the first pipe section for applying a predetermined circumferentially uniform distributed preload force to the coupling connection when the power threads are interengaged an additional increment after make-up of said helical spin-up threads and for preventing the pipe sections from moving axially apart relative to each other; and (f) sealing means for providing a fluid tight seal between the first and second pipe sections to prevent leakage of fluid therebetween.

2. The coupling of claim 1, wherein the pipe sections are vertically oriented riser pipe sections and the first section is the uppermost riser pipe section and the second section is the lowermost riser pipe section.

3. The coupling of claim 1, wherein the pipe sections are vertically oriented riser pipe sections and the second section is the uppermost riser pipe section and the first section is the lowermost riser pipe section.

4. The coupling of claim 1, wherein the shoulder means includes a torus formed around and integral with the outer surface of the first pipe section, the outer end of the second section engaging the torus for limiting said penetration.

5. The coupling of claim 4, wherein said power threads are formed on an outer surface of the power ring and an inner surface of the box.

6. The coupling of claim 1, wherein the power threads include a single set of continuous helical threads.

7. The coupling of claim 1, wherein the spin-up threads include first and second interengaged sets of continuous helical threads axially and radially spaced relative to each other.

8. The coupling of claim 1, wherein the spin-up threads are opposite hand to the power threads.

9. The coupling of claim 8, wherein the spin-up threads are right-handed and the power threads are left-handed.

10. The coupling of claim 8, wherein an upper surface of the box includes a plurality of openings for receiving a tool for rotating the box into place.

11. The coupling of claim 10, wherein an upper surface of the power ring includes a pair of openings located one on each side of each of the openings in the box, all of the openings being located so that portions of a power tool can be received in one of the openings of said pair and in the cooperating opening in the box for pulling them together to tighten the power ring relative to the box, and so that portions of a power tool can be received in the other opening of said pair and said box opening for pushing them apart for loosening the power ring relative to the box.

12. The coupling of claim 11, wherein a pair of spring-biased detent pins are mounted on the box for engaging notches formed in the power ring adjacent to said pair of openings, one of the pins engaging one notch when the power ring is loosened and the other pin engaging the other notch when the power ring is tightened for indexing the power rings in the loosened and tightened position, the pins projecting into said openings when engaging their respective notches and being pushed out of the notches by the power tool so that the power ring is movable relative to the box.

13. The coupling of claim 1, wherein the box and second pipe section include a lock means for preventing the box from moving relative to the second section and indexing the correct position for applying the preload to the connection, the lock means including a key slidable up and down and connected to the box and a notch in the second section for receiving the key, the notch being capable of being blocked when the box is rotated for preventing the key from falling into the notch until the notch is unblocked.

14. The coupling of claim 1, wherein when the power ring and box are threadedly engaged and in place on the first pipe section the outer end of the first pipe section projects beyond the outer end of the box for facilitating insertion of the first pipe section in the second pipe section.

15. The coupling of claim 14, wherein mating threads are formed between the outer surface of the first pipe section and inner surface of the box so that the outer end of the box can selectively be moved beyond the outer end of the first pipe section and retracted so that the outer end of the first pipe section projects beyond the outer end of the box.

16. The coupling of claim 1, wherein the sealing means includes a portion of the outer surface of the first section and a portion of the inner surface of the section cooperating to form a fluid-tight seal.

17. The coupling of claim 1, and further including second sealing means for sealing the area between where the power ring engages both the first pipe section and the box for maintaining lubricant in said area.

18. The coupling of claim 1, further comprising a choke or kill line section mounted to each of the pipe sections, the choke or kill line section mounted at the lower end of the first pipe section by a split ring means secured about the upper first section, the choke or kill line section mounted at the upper end of the second pipe section by a support bracket means attached to the end portion on the second pipe section, the choke or kill line sections of the first and second sections being secured by the split ring means and the support bracket means in a prearranged relationship relative to the first and second pipe sections to enable the choke or kill line sections to be penetratingly joined together in flow communicating relationship upon make-up of the coupling.

19. The coupling of claim 18 further comprising a threaded outer surface at the upper end of the choke or kill line section mounted at the upper end of the second pipe section, a support ring means threadably engaging the threaded outer surface of the choke or kill line section for engaging the support bracket means, the support ring being vertically adjustable by rotational movement about the threaded outer surface of the choke or kill line section for accommodating variation in length of the choke or kill line section.

20. A threaded male end portion of a pipe section for use in coupling adjacent pipe sections, wherein a mating end of another pipe section has a sealing surface and first and second shoulder means on its outer surface and a female union box rotatably mounted thereon, the inner surface of the union box having a set of continuous helical spin-up threads and having a set of continuous helical power threads and a separate power ring carried by the other pipe section, the power ring disposed about the other pipe section and having a set of helical power threads for interengagement with the helical power threads formed on the union box for operably securing the power ring to the union box in a predetermined axial relationship, the threaded male end portion comprising, (a) at least a first set of helical continuous spin-up threads formed on the outer surface of the male end portion and extending substantially continuously about the circumference of said outer surface and adapted to interengage with said helical continuous spin-up threads formed on the female union box;

(b) an annular shoulder on the male end portion for operably engaging said second shoulder disposed on the other pipe section for defining the maximum distance of the telescopic penetration; and (c) an annular sealing surface on the male end portion adapted to engage said sealing surface on the other pipe section for forming a fluid tight seal, and upon make-up of the threaded male end portion of the pipe section with the other pipe section, the power ring may be operably engaged with the first shoulder means on the outer surface of the other pipe section for applying a predetermined circumferentially uniform distributed preload force to the coupling connection and for preventing the pipe sections from moving axially apart relative to each other.

21. The threaded male end portion of claim 20, wherein said end portion is connected to the lowermost section of two underwater riser pipe sections which are to be coupled together.

22. The threaded male end portion of claim 20, wherein said end portion is connected to the uppermost section of two underwater riser pipe sections which are to be coupled together.

23. The threaded male end portion of claim 20, wherein the spin-up threads include first and second sets of threads, the first set being axially and radially spaced from the second set.

24. A threaded female union box assembly adapted for rotatably mounting on a first pipe section for coupling adjacent pipe sections, wherein an end of a first pipe section is telescopically inserted into an end of a second pipe section a predetermined distance, continuous helical spin-up threads being formed on an outer surface of said second pipe section, an annular shoulder extending around the outer surface of the first pipe section, the union box assembly comprising:

(a) a tubular box member including a set of continuous helical spin-up threads formed on the inner surface of the box member and adapted to interengage with the spin-up threads formed on the outer surface of the second pipe section for securing the union box to the second pipe section to prevent axial separation therebetween by threaded engagement extending continuously about the circumference of said outer surface and further including a set of continuous helical power threads formed on the box member; and (b) a power ring connectable to the box member through interengagement of continuous helical power threads formed on the power ring with corresponding power threads on the box member to provide a continuous circumferential engagement, the power ring being capable of mounting on the box member for engaging the annular shoulder formed on the first pipe section for preventing the pipe sections from moving axially apart relative to each other and for applying a predetermined preload force to the coupling connection when the coupling is formed by rotation of the power ring relative to the union box a prearranged amount.

25. The box assembly of claim 24, wherein the spin-up threads are of a different hand from the power threads.

26. The box assembly of claim 25, wherein an upper surface of the box includes a plurality of openings for receiving a tool for rotating the box in place, an upper surface of the power ring includes a pair of openings located one on each side of each of the openings in the box, all of the openings being located so that portions of a power tool can be received in one of the openings of said pair and in the cooperating opening in the box for pulling them together to tighten the power ring relative to the box, and so that portions of a power tool can be received in the other opening of said pair and said box opening for pushing them apart for loosening the power ring relative to the box.

27. The box assembly of claim 26, wherein a pair of spring-biased detent pins are mounted on the box for engaging notches formed in the power ring adjacent to said pair of openings, one of the pins engaging one notch when the power ring is loosened and the other pin engaging the other notch when the power ring is tightened for indexing the power rings in the loosened and tightened position, the pins projecting into said openings when engaging their respective notches and being pushed out of the notches by the power tool so that the power ring is movable relative to the box.

28. The box assembly of claim 24, wherein the box and second pipe section include a lock means for preventing the box from moving relative to the second section and indexing the correct position for applying the preload to the connection, the lock means including a key slidable up and down and connected to the box and a notch in the second section for receiving the key, the notch being capable of being blocked when the box is rotated for preventing the key from falling into the notch until the notch is unblocked.

29. The box assembly of claim 24, wherein the box member is adapted for coupling adjacent underwater riser pipe sections.

30. A lockable coupling for first and second pipe sections comprising a first pipe section carrying a connecting means on its lower end, said connecting means having first threads, a second pipe section having second threads provided on its upper end, the threads of the connecting means for the first pipe section and the second threads of the second pipe section adapted for interengagement with each other, and locking means for locking the first pipe section to the second pipe section after the first and second pipe sections are fully engaged, the locking means having a guide means attached to the outer wall of the first pipe section, a locking member of rigid material slidingly disposed with the guide means being shaped and dimensioned for restraining the locking member from circumferential movement therein and permitting limited axial movement of the locking member within the guide means, and notch means formed in the outer wall of the second pipe section and positioned to cooperate with a support block means adapted to bridge the notch means during threading of the connecting means and second pipe sections together, the locking member being prevented by said support block means from being urged into the notch means, whereby when the first and second pipe sections are vertically oriented and blocking means is not bridging the notch means and the connecting means and second pipe section having been fully threaded together, the locking member is urged by gravity into the notch means operably preventing relative motion of the connecting means threads and second pipe section threads so as to prevent accidental disengagement of said first and second pipe sections.

31. The lockable coupling of claim 30, wherein the locking member and guide means are formed with cooperating dovetail-shaped portions.

32. The lockable coupling of claim 30, wherein the locking member is elongated in the vertical dimension and one edge of the portion which can move into the notch means is tapered, and the portion of the notch means which cooperates with the tapered edge is formed with a complementary taper.

33. The lockable coupling of claim 30, wherein the guide means is formed as a groove which is open at its bottom-most end on the outer surface of the connecting means of the first pipe section.

34. The lockable coupling of claim 30, wherein a surface portion of the locking member includes a longitudinal groove terminating short of the uppermost edge of the locking member, the groove cooperating with a pin projecting from the connecting means of the first pipe section into the groove for limiting downward movement of the locking member.

* * * * *